United States Patent [19]

Tauster et al.

[11] Patent Number: 4,552,856

[45] Date of Patent: Nov. 12, 1985

[54] ZEOLITE CATALYST AND PREPARATION THEREOF

[75] Inventors: Samuel J. Tauster, Englishtown; David E. W. Vaughan, Flemington; John J. Steger, Pittstown, all of N.J.

[73] Assignee: Exxon Research and Engineering Co., Florham Park, N.J.

[21] Appl. No.: 550,898

[22] Filed: Nov. 10, 1983

[51] Int. Cl.[4] .......................... B01J 29/12; B01J 29/22
[52] U.S. Cl. .......................................... 502/74; 502/66
[58] Field of Search ..................................... 502/66, 74

[56] References Cited

U.S. PATENT DOCUMENTS

| | | | |
|---|---|---|---|
| 3,216,789 | 11/1965 | Breck et al. | 23/113 |
| 3,375,065 | 3/1968 | McDaniel et al. | 423/328 |
| 3,830,724 | 8/1974 | Schutt | 502/66 X |
| 3,847,796 | 11/1974 | Hilfman et al. | 502/66 X |
| 4,104,320 | 8/1978 | Bernard | 585/419 |
| 4,347,394 | 8/1982 | Detz et al. | 585/419 |
| 4,448,891 | 5/1984 | Cohen . | |

FOREIGN PATENT DOCUMENTS

| | | |
|---|---|---|
| 0040119 | 11/1981 | European Pat. Off. . |
| 0096479 | 12/1983 | European Pat. Off. . |
| 2360540 | 4/1978 | France . |
| 2114150 | 8/1983 | United Kingdom . |
| 2116450 | 9/1983 | United Kingdom . |

*Primary Examiner*—Carl F. Dees
*Attorney, Agent, or Firm*—Janet E. Hasak; E. Thomas Wheelock

[57] ABSTRACT

A catalyst which exhibits superior activity maintenance in dehydrocyclization reactions are defined as a type L zeolite having exchangeable cations of which at least 75% are selected from Group IA and calcium and barium cations and containing well dispersed particles of at least one Group VII noble metal the preparation of which involves contacting the zeolite substantially free of moisture with a solution of the noble metal.

8 Claims, No Drawings

ZEOLITE CATALYST AND PREPARATION THEREOF

BACKGROUND OF THE INVENTION

1. Field of the Invention

This invention relates to the preparation of a novel catalyst useful in reforming and comprising a zeolite containing one or more Group VIII noble metals in which the noble metal is highly dispersed throughout the zeolite.

2. Discussion of the Relevant References

Several materials have been employed as hydrocarbon conversion catalysts in such processes as reforming, catalytic dewaxing, alkylation, oxidation and hydrocracking. Examples of catalysts useful for this purpose include those materials comprising a catalytically active metal such as a Group VIII noble metal and optionally rhenium supported on or impregnated into a carrier.

Among the hydrocarbon conversion processes, catalytic reforming in the presence of hydrogen is one of the most important. Catalytic reforming is a refinery process designed to increase the octane number of naphtha. Typically, the naphtha is passed over a suitable catalyst under reforming conditions for example, elevated temperatures and pressures, well known in the industry, in the presence of hydrogen gas and a $H_2$/hydrocarbon mole ratio of 2 to 20. This process involves several different types of reactions, including isomerization, dehydrocyclization of paraffins to produce naphthenes and aromatics, dehydrogenation of cyclohexanes and other naphthenes and alkanes, isomerization/dehydrogenation of cyclopentanes, isomerization of normal paraffins to isoparaffins, and hydrocracking. Paraffin isomerization occurs relatively easily, but contributes only a limited improvement in octane number. The reforming reactions most important for the production of high octane components are those which produce aromatics.

The ideal reaction scheme minimizes the hydrocracking of long chain paraffins to gaseous hydrocarbons such as methane and ethane to improve the yield and selectivity to more valuable products of the other reforming reactions, particularly dehydrocyclization. Examples of known catalysts useful for reforming include platinum and optionally rhenium or iridium on an alumina support, platinum on type X and Y zeolites, provided the reactants and products are sufficiently small to flow through the pores of the zeolites, platinum on the intermediate pore size zeolites as described in U.S. Pat. No. 4,347,394 and platinum on cation exchanged type L zeolites.

While zeolite L catalysts, usually in their hydrogen form, have been employed as catalytic dewaxing catalysts and in other applications, they are particularly useful in reforming because they decrease the amount of hydrocracking which occurs during reforming. For example, U.S. Pat. No. 4,104,320 to Bernard et al. discloses that the use of zeolite L as a support increases the selectivity of the reaction for producing aromatic products. This improvement, however, has been made at the expense of catalyst life. This catalyst may be regenerated by subjection to a hydrogen treatment, oxidation, oxychlorination, calcining, water treatment, and reduction with hydrogen as disclosed in French Patent Publication No. 2,360,540 filed Sept. 9, 1981 to Bernard et al., or by hydrogen regeneration as disclosed in French Appl. No. 8,000,114 to Bernard.

U.K. Appln. No. 82-14147 filed May 14, 1982 to Wortel entitled "Improved Zeolite L" teaches that a highly crystalline zeolite L material having a cylindrical morphology has an improved catalyst life for dehydrocyclization reactions over conventionally prepared zeolite L as disclosed in U.S. Pat. No. 3,216,789. U.S. Pat. No. 4,448,891, issued May 15, 1984 to A. Cohen entitled "Improved Zeolite L Catalyst for Reforming" discloses treating a zeolite L material with an alkali solution of pH of at least 11 prior to calcining the formed catalyst so as to improve the dehydrocycling activity of the catalyst. Finally, Belg. Pat. Nos. 895,778 and 895,779 disclose use of a barium-exchanged zeolite L catalyst for high yields in reforming, dehydrocyclization, dealkylation and dehydroisomerization.

SUMMARY OF THE INVENTION

The present invention represents an improvement in the preparation of zeolite L type catalyst and involves treating the zeolite to allow for a relatively rapid pore filling and ion exchange operation to occur. Ion exchange is, normally, a relatively slow procedure that may take from several hours, e.g., 24 hours, to several days to complete. By this process, a catalyst comprising a type L zeolite and at least one noble metal selected from Group VIII of the Periodic Chart of the Elements can be prepared relatively rapidly by treating the zeolite, either by heating or vacuum or a combination thereof, so that upon contact with a solution of one or more noble metals, the metals are taken up relatively rapidly by the zeolite.

The class of catalysts prepared by this invention may be contacted with a feedstock e.g., naphtha, under reforming conditions to produce valuable products. Use of the catalysts herein is particularly advantageous because of their unique activity maintenance and selectivity in converting reactant organic compounds containing at least six carbon atoms, such as hexane or heptane, into aromatic products. The high level of noble metal dispersion within the zeolite channels is believed to account for both the exceptional activity maintenance in reforming and aromatization reactions and the unique ability of the catalyst to promote cyclization reactions.

DESCRIPTION OF THE PREFERRED EMBODIMENTS

The type L zeolites are defined herein as synthetic zeolites which crystallize in the hexagonal system with a characteristic x-ray diffraction pattern obtained from CuK radiation with the major d (Å) peak values set out in Table A:

| TABLE A |
| --- |
| 16.1 ± 0.3 |
| 7.52 ± 0.04 |
| 6.00 ± 0.04 |
| 4.57 ± 0.04 |
| 4.35 ± 0.04 |
| 3.91 ± 0.02 |
| 3.47 ± 0.02 |
| 3.28 ± 0.02 |
| 3.17 ± 0.01 |
| 3.07 ± 0.01 |
| 2.91 ± 0.01 |
| 2.65 ± 0.01 |
| 2.46 ± 0.01 |
| 2.42 ± 0.01 |

TABLE A-continued 2.19 ± 0.01

Thus, they share a common zeolite strucure. For purposes of this invention, type L zeolites have a general formula as follows:

$$0.9\text{--}1.3 M_{2/n}O : Al_2O_3 : xSiO_2 : yH_2O$$

where M designates at least one exchangeable cation, n represents the valence of M, y is any value from 0 to about 9, and x, which is disclosed as 5.2 to 6.9 in U.S. Pat. No. 3,216,789, may be outside this range provided the x-ray diffraction pattern of the zeolite is the same as zeolite L. Thus, type L zeolites with $SiO_2/Al_2O_3$ ratios less than 5.2 or greater than 6.9 are applicable to this invention. Preferably, the $SiO_2/Al_2O_3$ ratio may vary between about 2 and about 50. For example, one method of reducing the $SiO_2/Al_2O_3$ ratio involves leaching some of the $SiO_2$ with an with an alkali metal hydroxide, e.g., KOH, to produce type L zeolite useful in this invention. A more complete description of zeolite L is provided in U.S. Pat. No. 3,216,789. Zeolite L has channel-shaped pores undulating from about 7 to 13 Å in diameter and may occur in the form of cylindrical crystals with a mean diameter of at least 0.5 micron and an aspect ratio of at least 0.5 (as described, e.g., in U.K. Application No. 82-14147, the entire disclosure of which is incorporated herein by reference), as well as in other sizes and shapes.

The Group VIII noble metals which are necessary for catalytic activity are those metals from Group VIII of the Periodic Table of Elements which are selected from osmium, ruthenium, rhodium, iridium, palladium and platinum. Preferably, the metals which are employed herein are platinum, rhodium or iridium, and most preferably platinum. The metals may be present in any combination desired. Rhenium, a Group VIIB metal, may also be present so long as at least one Group VIII noble metal is present.

The amount of Group VIII noble metal present in the catalyst will be an effective amount and will depend, for example, on required catalyst activity, ease of uniform dispersion, and the crystal size of the type L zeolite. Crystal size limits the effective catalyst loading since highly loaded crystals of zeolite which have a large dimension parallel to the channels could easily lead to pore plugging during operation as the noble metal agglomerates inside the channels. Generally, however, the level of metal present will range from about 0.1 to 6% by weight of the catalyst, preferably 0.1 to 3.5%, and more preferably 0.1 to 2.5%. Furthermore, the amount of metal present is generally from 0.1 to 2.0% by weight of the catalyst, if the average zeolite crystallite size parallel to the channels is greater than about 0.2 micron, and from about 1.0 to 6% by weight if the average zeolite crystallite size parallel to the channels is no greater than about 0.2 micron.

Group VIII noble metals may be introduced into the zeolite by a variety of methods known in the art for example, ion exchange, impregnation, carbonyl decomposition, adsorption from the gaseous phase, introduction during zeolite synthesis, and adsorption of metal vapor. The zeolite preparation by this process of this invention involves relatively rapid ion exchange and pore filling by immersing the prepared zeolite into a solution of the noble metal or metals.

The reforming catalyst prepared by the method of this invention exhibits improved selectivity and activity maintenance over what is exhibited by other reforming catalysts outside the class defined herein under the same catalytic conditions. It is believed that the greater the degree of dispersion of the metal within the channels, i.e., onto the internal surface area of the zeolite, the better will be the activity maintenance of the catalyst.

The activity of a catalyst is a measure of its ability to convert feed to products. While a catalyst may have a high activity, the products formed may not be necessarily the desired products. The term "selectivity" is a measure of the ability of the catalyst to convert feed to desired products. Activity maintenance concerns the ability of the catalyst to maintain a portion of its activity over time at conversion conditions, other variables remaining constant.

The decline in catalyst activity at conversion conditions is believed to be due primarily to crystal growth or agglomeration of the noble metal particles and secondarily to the formation of coke on the external and internal surfaces of the catalyst. At the same noble metal loading, catalysts containing particles or crystals of noble metals of size greater than that disclosed above are less active and less selective than catalysts containing the smaller particles. Coke formation, probably due to complex condensation and dehydrogenation reactions, results in the shielding of the noble metal from the reaction mixture, thereby limiting the catalytic sites available for promoting reactions.

As catalyst activity declines by virtue of agglomeration and coke formation, the yield of desirable products will decline, and depending upon the economics of the operation a process employing the catalyst will have to be interrupted and catalyst activity restored to its initial value. Generally, catalytic activity can be maintained by increasing temperature, but there are limits beyond which the temperature cannot be increased, for example, temperatures which will change the nature of the zeolite or lead to undesirable side reactions.

Catalyst activity will decline over time as severity increases. Factors which affect severity include: hydrogen to oil mole ratio, hydrogen partial pressure, total pressure, temperature, feed rate per volume of catalyst (space velocity), and type of hydrocarbon in the feed.

In the measurement of activity maintenance all variables are fixed and only the catalyst differs. Thus, an activity of one catalyst over a period of time can be directly compared to the activity of another catalyst over the same time period where feed, hydrogen to oil ratios, pressures, etc. are constant.

Catalysts may be evaluated for their activity maintenance by a variety of tests, one of which, the Expedited Catalyst Aging Test (ECAT), has been developed where a total of 0.20 g of catalyst consisting of 20/40 mesh particles is mixed with 0.80 g of $SiO_2$ of 20/40 mesh. The resulting catalyst charge is introduced into a stainless steel downflow reactor of about 1 cm inner diameter equipped with a thermocouple. Before introduction of feed the catalyst is reduced in situ under flowing $H_2$ gas at temperatures no greater than 525° C. After reduction the feed is introduced into the reactor along with $H_2$ gas at a mole ratio of $H_2$:hydrocarbon of 6 and a space velocity of 50 w/w/hour, at a temperature of 510° C. and a pressure of 700 kPa (gauge). The products were analyzed using on-line gas chromatography, although other techniques are available and known in the industry. Catalysts are evaluated with respect to their benzene yield (weight percent) after 24 hours on feed.

Excellent activity maintenance is manifested by the catalysts of this invention, all of which provide a benzene yield in excess of 7 weight percent after 24 hours on oil in the ECAT test as described above using a feed comprising 20% by volume methylcyclopentane and 80% by volume n-hexane.

The surface of the catalyst over which the noble metal particles are dispersed necessarily includes the internal surface of the catalyst, i.e., the channels of the zeolite, but may also include dispersion over the external surface, which is considerably smaller. The dispersion will be present on those surfaces of the catalyst which are accessible to noble metal loading and dispersion techniques. The most preferred catalyst will contain highly dispersed noble metal atoms, all or substantially all of which are located inside the pores of the catalyst rather than on the exterior surface thereof.

The catalysts of this invention also exhibit substantial monofunctionality. Many known reforming catalysts exhibit bifunctionality in that not only do the noble metal atoms participate in the catalytic reaction, but also the acidic sites of the catalyst support. For example, a conventional catalyst consisting of Pt-Re metals on alumina aromatizes hexane through both the metal sites and the acid sites of the alumina support. In contrast, the catalyst herein behaves essentially monofunctionally in that the catalytic reactions predominantly occur on the noble metal sites of the catalyst, with only a small amount of catalysis occurring on the acidic sites initially produced when the catalyst is first reduced.

The process for preparing catalysts by this invention involves contacting a treated zeolite with a solution of the noble metal or metals. Contacting may be by immersion of the treated zeolite in the noble metal solution. Other methods of contact may be apparent to those skilled in the art. The important feature of the invention is that the zeolite be in a condition to rapidly take up the noble metal ions from the solution. The condition of the zeolite is that it is essentially moisture free. This may be accomplished, for example, by heating the zeolite under conditions that will make it relatively dry. Clearly, the heating conditions are time/temperature related and inversely proportional, that is, the longer the heating time, the lower the temperature of heating. Typically, the zeolite may be heated from just above room temperature which is about 18° C. up to about 200° C., preferably the heating temperature ranges from 70° to 200° C. and more preferably 100° to 150° C.

After heating, the zeolite is immediately contacted with the noble metal solution. By immediate contact, we mean that the zeolite is within the temperature ranges mentioned above when contacted with the noble metal solution.

Other methods of treating the zeolites may also be useful to accomplish the same result, for example, heating under vacuum (where the temperature may be lower than heating at atmospheric pressure) or simply providing a vacuum for the zeolite. Again, the degree of vacuum, the time, and the temperature are inter-related; the important factor being to replace the zeolite in a condition to take up the noble metal from solution rapidly, as if, for example, the zeolite was a sponge soaking up water.

The Group VIII noble metal can be in any soluble form, e.g., chloroiridic acid, chloroplatinic acid, $Pt(NH_3)_4Cl_2$, etc., but preferably an aqueous solution. The solution should be relatively concentrated, for example, about 7 to 20 mg equivalent noble metal per cubic centimeter of solution, preferably about 10 to 15 mg metal equivalent per cc.

Again, the period of contact of the treated zeolite with the solution will be a function of the degree of treating of the zeolite. The more severe the conditions of treatment the more rapid will be the take up of metals and the contact time will be shortened. Generally, a reaction will be substantially complete in less than 1 to 2 minutes, preferably less than 60 seconds. For example, if the preferred temperature range of 100° to 150° C. is employed, the typical contact time with the noble metal solution is less than about 10 seconds, preferably about 2 to 10 seconds, and more preferably 2.5 to 5 seconds. During the period of contact noble metal loading of the zeolite is effected by ion exchange and pore filling. In fact, the degree of ion exchange is quite substantial and in view of the relatively short contact period, quite surprising.

In the process of this invention, zeolite L types having a smaller average crystal size, that is, below about 0.2 microns are preferable because of the shorter path of ingress and egress of reactants and products. Also, because of the shorter path length, agglomerates of noble metal in a channel are less likely to block off a substantial amount of highly dispersed noble metal within the channel.

After the contacting step is complete, the noble metal loaded type L zeolite is withdrawn from the solution and dried, preferably in an oven at a temperature of from about 80° to 200° C., preferably 100° to 150° C., for about 2 to 20 hours and reduced in hydrogen. A calcining step may precede the hydrogen reduction step.

The reforming process herein is not limited to conventional reforming of naphthas derived from petroleum or other sources of hydrocarbons and boiling in the range of about 71° to 216° C., but may also be employed to produce the corresponding aromatic products from any reactant organic compound containing at least six carbon atoms, including those which contain reactant functional groups. Examples of reactant compounds suitable for this purpose include paraffins such as n-hexane, n-heptane, n-octane, n-nonane, etc., preferably naphtha boiling in the fraction between 71° and 216° C. Preferred reactions herein are aromatization of n-hexane to benzene, n-heptane to toluene, and n-octane to ethylbenzene and/or xylenes. n-Hexane may be present in the feed or produced by isomerization of methylpentanes and methylcyclopentane. Since the catalyst is monofunctional and does not promote isomerization without cyclization, feed compounds such as dimethylbutanes are not effective.

Additional reactions where the reforming catalyst may be employed advantageously include benzene production from streams such as light naphtha, i.e., a naphtha boiling between about 30° and 100° C., high octane gasoline production from naphtha or light virgin naphtha where the endpoint is between $C_7$ and $C_{12}$ inclusive.

The reforming process described above are carried out under general reforming conditions in the presence of hydrogen at a moderate pressure to favor the aromatization reaction thermodynamically. For traditional reforming of paraffins to aromatics, the temperature depends on the particular paraffin, but for acceptable rate and selectivity preferably ranges from about 400° to 550° C., more preferably from about 450° to 520° C. at pressures of about 200 KPa to 5 MPa, more preferably about 500 KPa to 4 MPa. If the temperature is much below about 400° C. the yield of product is quite low, and if the temperature substantially exceeds about 550° C., other reactions occur which also diminish the yield of product. The liquid hourly space velocity of this reforming reaction is preferably from about 0.5 to 20 w/w/hour, more preferably from 1 to 10 w/w/hour, and the $H_2$/reactant mole ratio is preferably from about 2 to 20, more preferably from about 4 to 10.

The dehydrocyclization reaction is generally carried out by injecting a feedstock charge in the presence of hydrogen gas into a reactor containing the catalyst.

To minimize any hydrocracking reactions which tend to prevail at the beginning of the reaction, it may be desirable to introduce a small amount (less than 0.1% by weight) of sulfur to the catalyst.

In the following examples, which are not limiting in any respect, the parts and percentages are by weight for solids and liquids and by volume for gas compositions, unless otherwise noted, and the temperatures are in degrees Celsius.

EXAMPLE 1

A first zeolite L (small crystal size) having an average particle size of about 0.1 micron was prepared by the following method:

Slurry A was made by mixing in a 1 gallon Hobart mixer 100.7 g KOH.1/2$H_2$O, 81 g $Al_2O_3$.3$H_2$O, 1469 g K Sil 6 (potassium silicate of P.Q. Corp.), 126.4 g alum ($Al_2$)($SO_4$)$_3$.17$H_2$O) and 723 g $H_2$O. After thorough homogenization the sample was placed in a six gallon polypropylene can. A second identical batch was then mixed and added to the can, which was then placed in an air oven at 100° C. The total composition had a stoichiometry of:

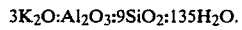
3$K_2$O:$Al_2O_3$:9$SiO_2$:135$H_2$O.

Slurry B having the same stoichiometry was made two days later, but in a much larger batch (36 kilograms) consisting of:

| |
|---|
| 1450 g KOH.½ $H_2$O |
| 1167 g $Al_2O_3$.3 $H_2$O (Alcoa C31) |
| 21,147 g K Sil 6 (P.Q. Corp.) |
| 1820 g alum ($Al_2(SO_4)_3$.17 $H_2$O) |
| 10,416 g $H_2$O. |

After mixing in a commercial Hobart mixer, the gel was placed in a six-gallon polypropylene can. To this can was then added 1800 g of slurry A, which had now been hot aged for 2 days and showed minor zeolite L crystallization. After thorough mixing, the can was sealed and placed in an air oven at 98° C. After reacting for 66 hours the container was cooled, and the contents filtered and washed. Analysis of the sample showed excellent zeolite L by x-ray diffraction analysis, and chemical analysis gave a composition of:

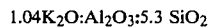
1.04$K_2$O:$Al_2O_3$:5.3 $SiO_2$

The BET $N_2$ surface area was 291 $m^2$/g. The sample was reslurried in deionized water, and the pH was adjusted to 8.5 with a few drops of HCl, then filtered and dried at 110° C. Chemical analysis showed no change in the Si/Al ratio but the K/Al ratio was now 0.98. The BET nitrogen surface area measurement increased to 380 $m^2$/g. Scanning electron microscope analysis showed the sample to comprise 0.1 to 1 micron agglomerates of microcrystals less than 0.1 micron in diameter.

Catalyst L was prepared by placing 6 g of the small crystal size zeolite at 20/40 mesh in a wire-mesh basket and drying it at about 120° C. overnight. The wire basket containing the zeolite was removed from the drying oven and immediately immersed for 5 seconds in a solution of Pt($NH_3$)$_4$$Cl_2$ containing 11.7 mg Pt/cc. Following the immersion-loading, the basket was withdrawn from the solution and placed in a drying oven at about 120° overnight. The catalyst was then placed in a tube furnace and treated in flowing He at 100° C. for 20 hours, then 20% $O_2$ (80% He) at 200° C. for 2 hours, and then at 350° C. for 3 hours. The catalyst was analyzed and found to contain 3.3% Pt.

The large crystal size zeolite was loaded with 0.6% Pt (Catalyst M). Catalyst M was prepared by slurrying 150 g of the zeolite in 2000 cc $H_2$O and adding Pt($NH_3$)$_4$$Cl_2$ solution containing 900 mg Pt during a 6 hour period. Following the addition, stirring was continued overnight. The mixture was then filtered and the loaded potassium-exchanged zeolite L was dried at about 120° C. for 20 hours, then pressed and screened to 20/40 mesh and calcined in flowing 10% $O_2$ (90% He) at temperatures up to and including 350° C.

The catalysts were mixed in an amount of 0.2 g with 0.8 g of $SiO_2$ of the same mesh and charged into a stainless steel downflow reactor of 1.3 cm outer diameter and 1 cm inner diameter equipped with a thermocouple. Each was reduced under flowing $H_2$ at about 525° C. or less and then contacted with a feed containing 20% methylcyclopentane and 80% n-hexane at 510° C. at 700 kPa (gauge), a space velocity of 50 w/w/hr and a $H_2$/hydrocarbon ratio of 6. The results using the catalysts are shown in Table I. The data indicate that the 3.3% Pt loaded catalyst on the zeolite with small average crystallite size has better activity for a sustained period of time. The same general trend was observed when the feed was 100% n-hexane for both benzene and carbocyclic isomer production.

TABLE I

| | Benzene Yield at 3 hours (%) | Benzene Yield at 24 hours (%) |
|---|---|---|
| Catalyst L | 26 | 22 |
| Catalyst M | 18.5 | 8.3 |

2.8% Pt loaded catalyst is inferior to the 0.6% Pt loaded catalyst in benzene yield when the zeolite base has a larger average crystal particle size of at least 0.5 micron. The observation that the 2.8% Pt loaded catalyst is inferior is believed to be due to the large crystal size of the zeolite.

EXAMPLE 2

A number of catalyst samples were prepared using the zeolite preparation procedure outlined in Example 1. The samples were predried in drying ovens at about 120° C. unless otherwise noted. After drying, the samples were immersed in a platinum solution, Pt($NH_4$)$_3$$Cl_2$ containing 11.7 mg of platinum per cc of solution. The immersion consisted of three seconds from no contact with the solution to complete immersion, three seconds of complete immersion and a rapid removal of the metal loaded zeolite from the solution. (Immersion time was an average of 4.5 seconds for the average zeolite particle in the sample.) Following immersion, all samples were dried in the drying oven at 120° C. and calcined as noted.

Table II shows the benzene yields in an ECAT test after two periods, three hours and 24 hours or as noted. The feed was 80% n-hexane, 20% methylcyclopentane, each by volume, unless otherwise noted.

TABLE II

| Sample No. | Pt Loading, wt. % | ECAT Results Benzene Yield | |
|---|---|---|---|
| | | 3 hrs. | 24 hrs. |
| 787-14 | 2.6 | 24.2 | 16.1 at 23 hrs. |
| | Calcined at 200° C. for 1 hr., then 350° C. for 3 hrs. | | |
| 787-30 | 2.8 | 22.1 at 2 hrs. | 15.6 at 44 hrs. |
| | Not calcined; zeolite contained 0.2% Ca, K/Al = 0.9 | | |
| 787-31 | 2.2 | 10.2 at 2 hrs. | 4.6 |
| | Zeolite predried at 250° C., not calcined after immersion; unit employed found not to give reproducible results | | |
| 787-71 | 2.2 | 17.5 at 2 hrs. | 13.2 at 25 hrs. |
| | Feed in ECAT was 100% n-hexane; catalyst calcined at 200° C. for 2 hrs., 350° C. for 3 hrs. | | |
| 788-18 | 2.1 | 15.7 | — |
| | Zeolite predried at 350° C.; catalyst calcined at 200° C. for 1 hr., 350° C. for 3 hrs. | | |
| 788-24 | 2.6 | 9.5 at 4 hrs. | 3.6 at 20 hrs. |
| | Calcined at 200° C. for 1 hr., 350° C. for 3 hrs. This zeolite had relatively long path of channel, i.e., zeolite crystal size greater than 0.2 microns and shows that such materials are less preferred. | | |
| 788-28 | 2.6 | — | — |
| | Zeolite rinsed in water; calcined as in 788-24. Same sample as 788-24, results not as good, test aborted. | | |
| 788-54 | 2.8 | 26.3 at 2 hrs. | 22.5 at 22 hrs. |
| | Calcined at 200° C. for 2 hrs., 350° C. for 3 hrs. | | |
| 788-64 | 2.1 | — | 10.8 |
| | Zeolite was pre-humidified before immersion; catalyst calcined at 200° C. for 2 hrs., 350° C. for 3 hrs.; results poor because of lack of empty pores prior to immersion | | |
| 018-4 | 3.0 | 24.5 | 14 at 25 hrs. |
| | Catalyst not calcined. | | |
| 018-9 | 2.8 | 27.8 | 21.1 |
| | Catalyst not calcined; zeolite contained 0.2 Ca, K/Al = 0.9 | | |
| 018-18 | 2.8 | 32.7 | 28.9 at 25 hrs. |
| | Catalyst not calcined; zeolite contained 0.2 Ca, K/Al = 0.9; feed was n-hexane | | |
| 555-138 | 2.6 | 25.3 | 13.8 |
| | Calcined at 200° C. for 1 hr., 350° C. for 3 hrs. | | |
| 555-130 | 2.4 | 25.5 | 13.3 |
| | Calcined at 200° C. for 1 hr., 350° C. for 3 hrs. | | |

We have found that calcining below about 400° C. is required to prepare an active catalyst.

What is claimed is:

1. A process for preparing a catalyst which comprises substantially eliminating moisture from a zeolite L by heating the zeolite, contacting the heated zeolite L with a solution containing at least one Group VIII noble metal, separating a noble metal loaded zeolite from the solution and, calcining the loaded zeolite L at a temperature less than about 400° C.

2. The process of claim 1 wherein the zeolite L is immersed in the noble metal solution for less than about 2 minutes.

3. The process of claim 2 wherein the noble metal is platinum.

4. The process of claim 2 wherein the zeolite has an average crystal size of no greater than about 0.2 microns.

5. The process of claim 2 wherein the solution concentration ranges from about 7 to 20 mg equivalent of noble metal per cc of solution.

6. A process for preparing a reforming catalyst which comprises substantially eliminating the moisture from a zeolite L by heating the zeolite from about 70° to 200° C., contacting the heated zeolite with a solution containing from about 7 to 20 mg equivalent per ml. of at least one Group VIII noble metal for a period of less than about 2 minutes, separating a metal loaded zeolite from the solution and, calcining the loaded zeolite at a temperature less than about 400° C.

7. The process of claim 6 wherein the noble metal is platinum.

8. The process of claim 7 wherein the average crystal size of the zeolite is no greater than about 0.2 microns.

* * * * *